United States Patent
Lee et al.

(10) Patent No.: US 9,643,280 B2
(45) Date of Patent: May 9, 2017

(54) LASER PROCESSING APPARATUS

(71) Applicants: Samsung Display Co., Ltd., Yongin, Gyeonggi-Do (KR); Fraunhofer-Gesellschaft zur Förderung der angewandten Forschung e.V., Munich (DE)

(72) Inventors: Doh-Hyoung Lee, Yongin (KR); Choong-Ho Lee, Yongin (KR); Sung-Sik Yun, Yongin (KR); Tong-Jin Park, Yongin (KR); Arnold Gillner, Roetgen (DE); Nelli Hambach, Aachen (DE); Stephan Eifel, Cologne (DE); Jens Holtkamp, Wassenberg (DE); Lasse Büsing, Aachen (DE); Alexander Gatej, Karlsruhe (DE)

(73) Assignees: Samsung Display Co., Ltd., Samsung-ro, Giheung-Gu, Yongin-si, Gyeonggi-Do (KR); FRAUNHOFER-GESELLSCHAFT ZUR FORDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/085,280

(22) Filed: Nov. 20, 2013

(65) Prior Publication Data

US 2014/0177055 A1    Jun. 26, 2014

(30) Foreign Application Priority Data

Nov. 20, 2012  (KR) ........................ 10-2012-0131866

(51) Int. Cl.
*H01S 3/10*       (2006.01)
*B23K 26/06*   (2014.01)
(Continued)

(52) U.S. Cl.
CPC ........ *B23K 26/0604* (2013.01); *B23K 26/066* (2015.10); *B23K 26/0648* (2013.01);
(Continued)

(58) Field of Classification Search
CPC .. H01S 3/08009; H01S 3/10023; H01S 3/005; G02B 26/0808; G02B 26/0816;
(Continued)

(56) References Cited

U.S. PATENT DOCUMENTS 4,410,237 A * 10/1983 Veldkamp ............ G02B 5/1871
                                                                  342/22
5,783,798 A    7/1998 Abraham
(Continued)

FOREIGN PATENT DOCUMENTS

CN    102139484 A    8/2011
CN    102554466 A    7/2012
(Continued)

OTHER PUBLICATIONS

Zoom lens, Oct. 23, 2013 (http://en.wikipedia.org/wiki/Zoom_lens).

*Primary Examiner* — Bumsuk Won
*Assistant Examiner* — Ephrem Mebrahtu
(74) *Attorney, Agent, or Firm* — Robert E. Bushnell, Esq.

(57) ABSTRACT

A laser processing apparatus includes: a laser generator that generates a laser beam, a diffractive optical element that divides the laser beam generated by the laser generator into a plurality of sub-laser beams, and a beam gap adjustor that adjusts a gap between neighboring ones of the plurality of sub-laser beams. Therefore, by installing a diffractive optical element that divides a laser beam that is generated by the laser generator into the plurality of sub-laser beams and a beam gap adjustor to adjust a gap between a plurality of sub-laser beams, the laser processing apparatus can form a
(Continued)

processing pattern of various resolutions in a shadow mask while improving a processing speed of the shadow mask.

21 Claims, 10 Drawing Sheets (51) Int. Cl.
G02B 27/09 (2006.01)
G02B 26/08 (2006.01)
B23K 26/38 (2014.01)
B23K 26/066 (2014.01)

(52) U.S. Cl.
CPC .......... B23K 26/0652 (2013.01); B23K 26/38 (2013.01); G02B 26/0808 (2013.01); G02B 26/0816 (2013.01); G02B 27/0911 (2013.01)

(58) Field of Classification Search
CPC ........ G02B 13/08; G02B 13/10; G02B 27/09; G02B 27/0905; G02B 27/0911; B23K 26/0604; B23K 26/0648; B23K 26/0652; B23K 26/066; B23K 26/38
USPC ............ 219/121.69, 121.78, 121.75, 121.79; 359/557, 566, 668, 669, 671, 676, 678
See application file for complete search history.

(56) References Cited

U.S. PATENT DOCUMENTS

| | | | |
|---|---|---|---|
| 6,512,781 B1 * | 1/2003 | Borstel et al. ................. | 372/19 |
| 6,636,293 B1 * | 10/2003 | Shiraishi ................. | G03F 7/201 355/53 |
| 6,720,519 B2 * | 4/2004 | Liu ................... | B23K 26/0075 219/121.61 |
| 2002/0105890 A1 * | 8/2002 | Ogasawara .............. | 369/112.02 |
| 2003/0102291 A1 | 6/2003 | Liu et al. | |
| 2004/0021952 A1 * | 2/2004 | Meyers ................ | G02B 6/2931 359/668 |
| 2006/0000816 A1 * | 1/2006 | Hogan ............... | B23K 26/0608 219/121.75 |
| 2008/0076267 A1 * | 3/2008 | Oishi ................. | B23K 26/0613 438/785 |
| 2009/0323482 A1 * | 12/2009 | Nakanuma ........... | G11B 7/1275 369/44.23 |
| 2010/0142355 A1 * | 6/2010 | Katayama ........... | G02B 5/1871 369/112.04 |
| 2010/0264423 A1 * | 10/2010 | Wood et al. .................... | 257/75 |
| 2011/0193269 A1 * | 8/2011 | Ito ........................ | B23K 26/032 264/400 |
| 2011/0199586 A1 * | 8/2011 | Morikuni ....................... | 353/81 |

FOREIGN PATENT DOCUMENTS

| | | |
|---|---|---|
| EP | 1063048 | 12/2000 |
| EP | 1145797 | 10/2001 |
| JP | 2010-214431 A | 9/2010 |
| KR | 1020050083421 A1 | 8/2005 |
| KR | 1020060055941 A | 5/2006 |
| KR | 1020100105381 A | 9/2010 |
| KR | 1020100105386 A | 9/2010 |
| KR | 10-1010600 B1 | 1/2011 |
| WO | 2011116968 | 9/2011 |

* cited by examiner

LASER PROCESSING APPARATUS

CLAIM OF PRIORITY

This application makes reference to, incorporates the same herein, and claims all benefits accruing under 35 U.S.C. §119 from an application earlier filed in the Korean Intellectual Property Office filed on 20 Nov. 2012 and there duly assigned Serial No. 10-2012-0131866.

BACKGROUND OF THE INVENTION

Field of the Invention

The described technology relates generally to a laser processing apparatus that can adjust the spacing between neighboring ones of a plurality of sub-laser beams.

Description of the Related Art

As a method of manufacturing a shadow mask for depositing an organic material of an organic light emitting diode (OLED) display, a wet etching method is often used. However, in a method of manufacturing a shadow mask using the wet etching method, it is difficult to manufacture a shadow mask of an exquisite pattern due to the non-uniformity of wet etching, and as a side surface shape of the pattern is formed in a specific form, the shadow mask cannot have a wide deposition angle. Further, when manufacturing a large-sized shadow mask, due to a limitation of rolling technology, a thickness of a steel plate increases, a wet etching time is extended, and thus the pattern has a non-uniform form.

In order to overcome such a problem of wet etching, a method of manufacturing a shadow mask using a laser processing apparatus was suggested. However, in a method of manufacturing a shadow mask using a laser processing apparatus, when processing using a single laser beam, much time is required for manufacturing of the shadow mask. When a laser beam is divided and processed into a plurality of laser beams using a diffractive optical element (DOE), a production time of the shadow mask may be shortened, but because a gap between laser beams is fixed, it difficult to manufacture a shadow mask of various resolutions.

The above information disclosed in this Background section is only for enhancement of understanding of the background of the described technology, and therefore it may contain information that does not constitute prior art under 35 U.S.C. §102.

SUMMARY OF THE INVENTION

The described technology has been made in an effort to provide a laser processing apparatus having advantages of rapidly producing a shadow mask of various resolutions.

According to one aspect of the present invention, there is provided a laser processing apparatus that includes a laser generator that generates a laser beam, a diffractive optical element (DOE) that divides the laser beam that is generated by the laser generator into a plurality of sub-laser beams and a beam gap adjustor that adjusts a gap between neighboring ones of the plurality of sub-laser beams.

The beam gap adjustor may include an anamorphic optical system that changes a gap between neighboring ones of the plurality of sub-laser beams in only one direction that is perpendicular to a propagation direction of the sub-beams and a zoom optical system that is changes a gap between neighboring ones the plurality of sub-laser beams in two different intersecting directions that are both perpendicular to the propagation direction of the sub-beams. The anamorphic optical system may include a pair of prism lenses. The anamorphic optical system may also include a rotation unit that adjusts a tilt angle of ones of the pair of prism lenses by rotating ones of the pair of prism lenses and a controller that controls an operation of the rotation unit.

The laser processing apparatus may also include an aberration correction optical system that corrects an aberration according to a relative position between ones of the plurality of sub-laser beams. The aberration correction optical system may include a first aberration correction optical system arranged between the anamorphic optical system and the zoom optical system and in propagating paths of the sub-laser beams and a second aberration correction optical system arranged at the rear side of the zoom optical system and in propagating paths of the sub-laser beams.

The beam gap adjustor may include a first anamorphic optical system that changes a gap between neighboring ones of the plurality of sub-laser beams in one direction perpendicular to a propagation direction of the sub-laser beams and a second anamorphic optical system that changes a gap between the plurality of sub-laser beams, having passed through the first anamorphic optical system, in a second direction intersecting the one direction and perpendicular to the propagation direction of the sub-laser beams. The first anamorphic optical system may include a pair of first prism lenses, the second anamorphic optical system may include a pair of second prism lenses, the first prism lenses and the second prism lenses may be orthogonal to each other. The laser processing apparatus may also include an aberration correction optical system that corrects an aberration according to a relative position between the plurality of sub-laser beams.

The aberration correction optical system may include a first aberration correction optical system arranged at the rear side of the second anamorphic optical system and in propagating paths of the sub-laser beams and a second aberration correction optical system arranged at the rear side of the first aberration correction optical system and in propagating paths of the sub-laser beams. The DOE may be adapted to produce different sized gaps between neighboring ones of is the plurality of sub-laser beams based on different directions taken perpendicular to a propagation direction of the sub-laser beams. The beam gap adjustor may include a zoom optical system that changes gaps between neighboring ones of the plurality of sub-laser beams in all directions perpendicular to the propagation direction of the sub-laser beams. The laser processing apparatus may also include an aberration correction optical system that corrects an aberration according to a relative position between the plurality of sub-laser beams. The aberration correction optical system may include a first aberration correction optical system arranged at the front side of the zoom optical system and in propagating paths of the sub-laser beams and a second aberration correction optical system arranged at the rear side of the zoom optical system and in propagating paths of the sub-laser beams.

The laser processing apparatus may also include a high order beam block mask to remove a high order sub-laser beam of the plurality of sub-laser beams. The laser processing apparatus may also include a beam expander arranged at the front side of the DOE to inject a laser beam of uniform intensity into the DOE. Each of the plurality of sub-laser beams may propagate in a direction that is parallel to one another.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive Like reference numerals designate like elements throughout the specification.

Figure 1:
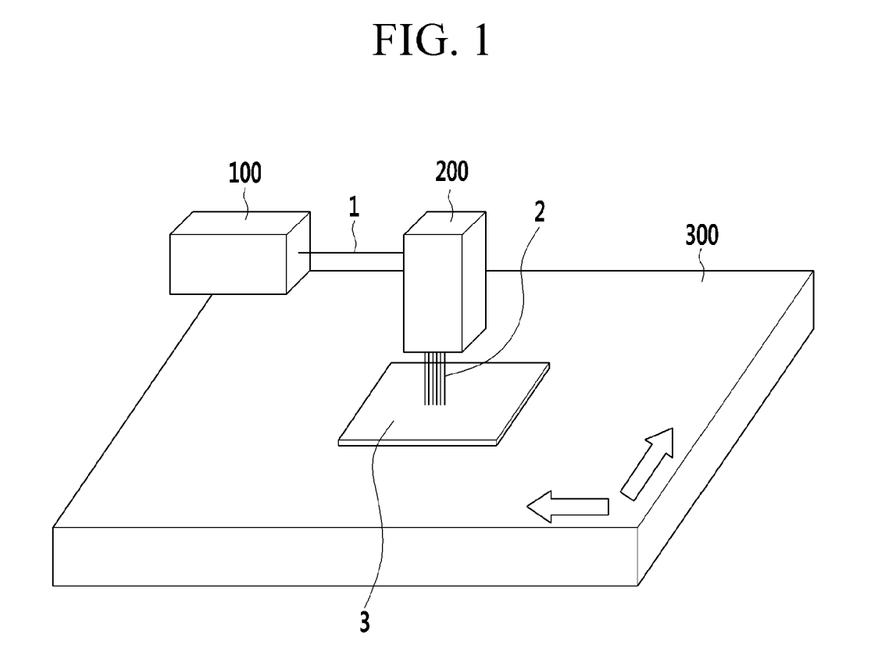
FIG. 1 is a schematic diagram illustrating a laser processing apparatus according to a first exemplary embodiment.
Figure 3:
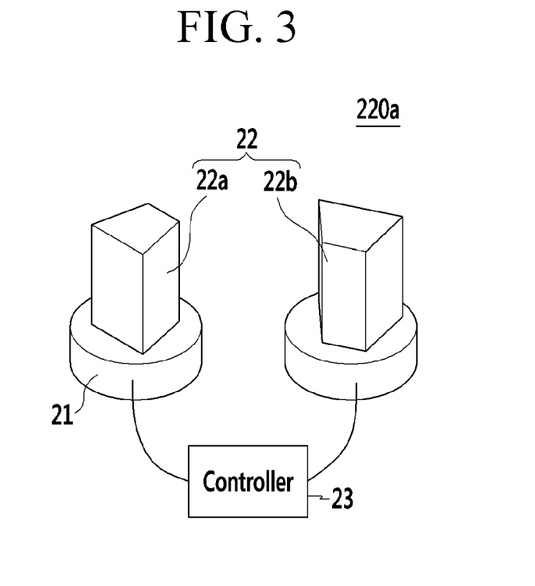
FIG. 3 is a perspective view illustrating an anamorphic optical system of FIG. 2.
Figure 4:
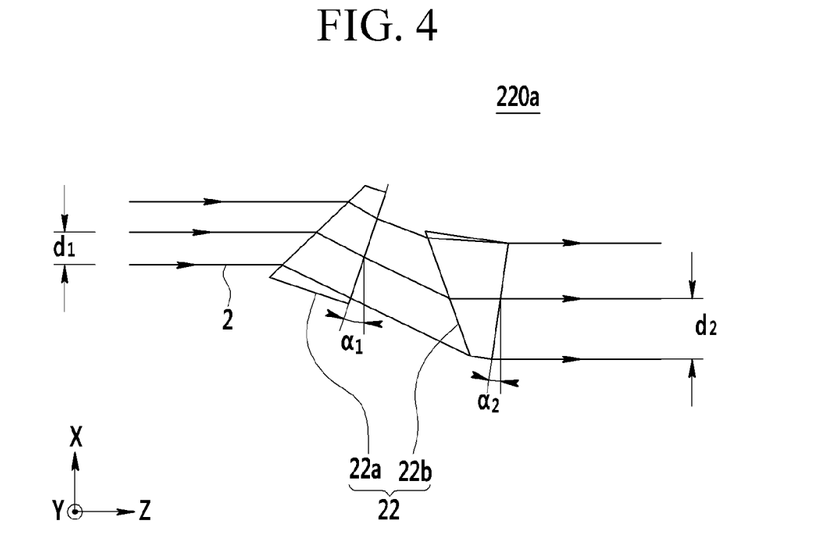
FIG. 4 is an explanatory diagram of the anamorphic optical system of FIG. 2.
Figure 5:
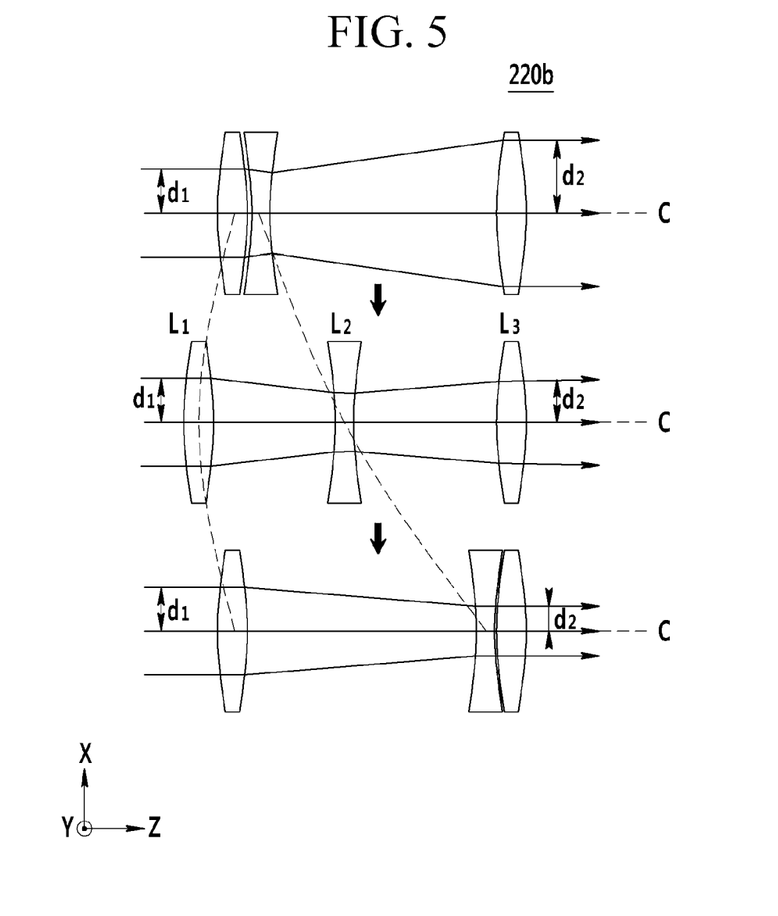
FIG. 5 is an explanatory diagram of a zoom optical system of FIG. 2.
Figure 6:
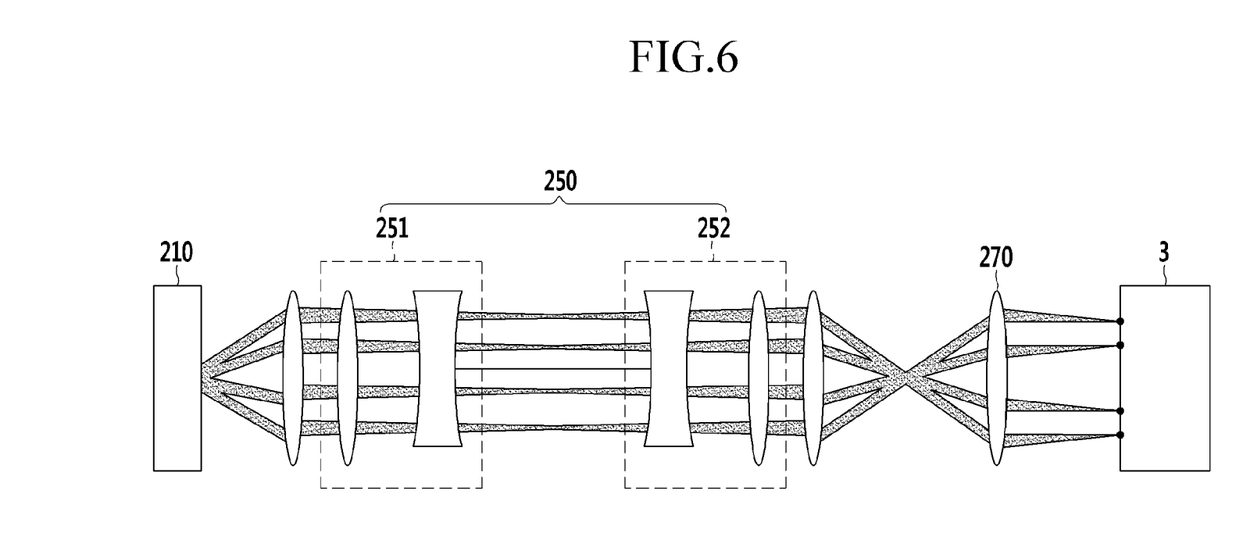
FIG. 6 is an explanatory diagram of an aberration correction optical system of FIG. 2.

Hereinafter, a laser processing apparatus according to a first exemplary embodiment will be described in detail with reference FIGS. 1 to 6. FIG. 1 is a schematic diagram illustrating a laser processing apparatus according to the first exemplary embodiment, FIG. 2 is a block diagram illustrating a configuration of a laser processing apparatus according to a first exemplary embodiment, FIG. 3 is a perspective view illustrating an anamorphic optical system of FIG. 2, FIG. 4 is an explanatory diagram of the anamorphic optical system of FIG. 2, FIG. 5 is an explanatory diagram of a zoom optical system of FIG. 2, and FIG. 6 is an explanatory diagram of an aberration correction optical system of FIG. 2.

Figure 2:
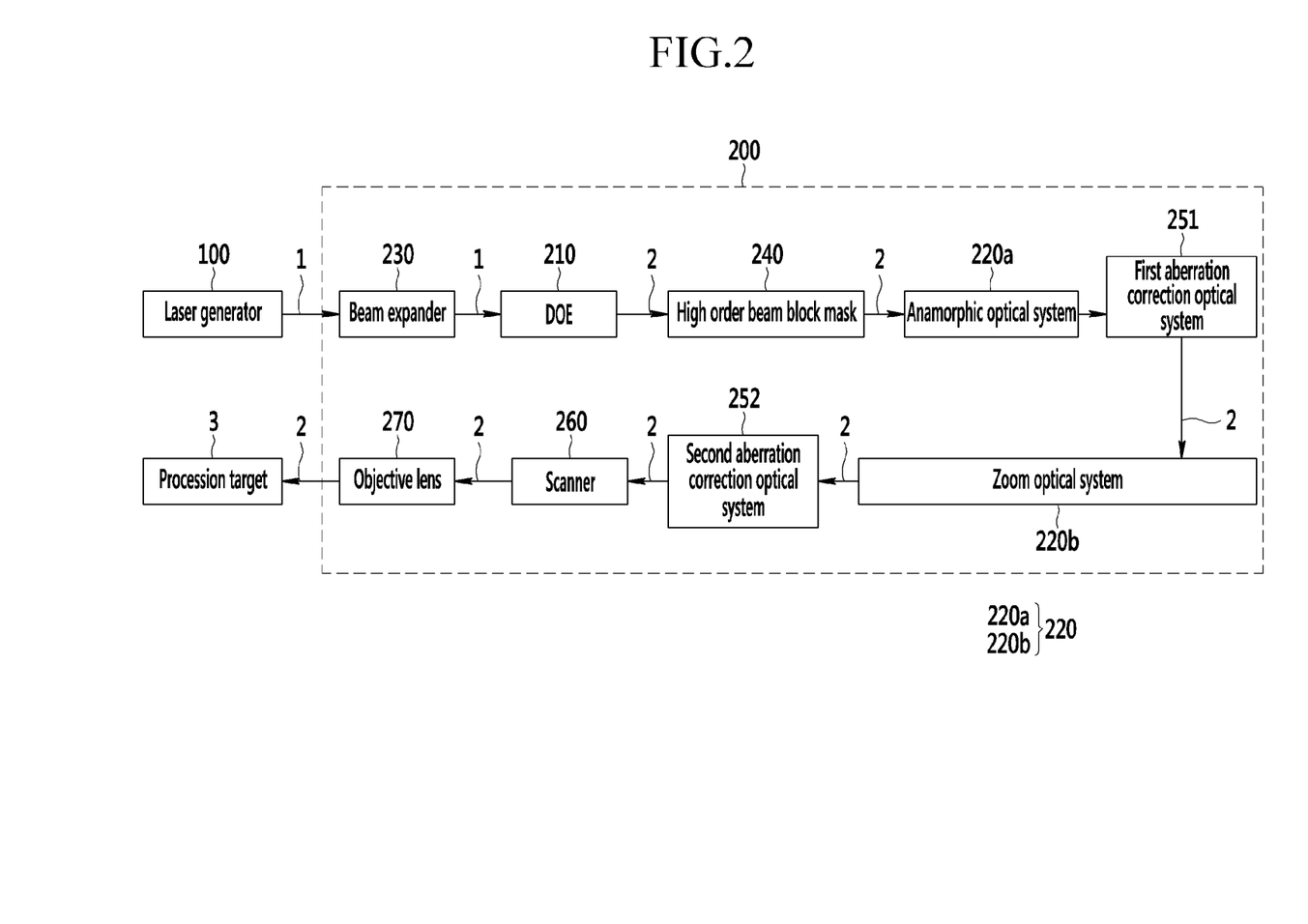
FIG. 2 is a block diagram illustrating a configuration of a laser processing apparatus according to a first exemplary embodiment.

As shown in FIGS. 1 and 2, the laser processing apparatus includes a laser generator 100 that generates a laser beam 1, a beam splitting optical system 200 that splits laser beam 1 into a plurality of sub-laser beams 2 that propagate along a z-axis in parallel with each other and adjusts the gap between neighboring ones of the sub-laser beams 2, a stage 300 and a processing target 3 that processes the sub-laser beams 2 and that can adjust a position of the processing target 3. The beam splitting optical system 200 includes a diffractive optical element (DOE) 210 to split laser beam 1 into a plurality of sub-laser beams 2, and a beam gap adjustor 220 that adjusts the gap between neighboring ones of the sub-laser beams 2.

The processing target 3 may be a shadow mask 3 for depositing an organic material of an OLED display. The laser generator 100 may be a picosecond (i.e. $10^{-12}$) laser generator or a femtosecond (i.e. $10^{-15}$) to micro second (i.e. $10^{-6}$) laser generator. The picosecond laser generator makes heat transfer and thermal distortion from the processing target 3 to a periphery of a laser processing portion to a minimum using a pulse of several picoseconds, and processes into a shape of high precision, i.e., a shape having an error within 2 μm.

The beam splitting optical system 200 includes a diffractive optical element (DOE) 210 that divides the laser beam 1 that is generated by the laser generator 100 into a plurality of sub-laser beams 2 and a beam gap adjustor 220 that adjusts a gap between neighboring ones of the plurality of sub-laser beams 2. Further, the beam splitting optical system 200 includes a beam expander 230 that is positioned at the front side of the DOE 210, a high order beam block mask 240 that removes a high order sub-laser beam of the plurality of sub-laser beams 2, an aberration correction optical system 250 that corrects an aberration according to a relative position between the plurality of sub-laser beams 2, a scanner 260 that changes propagating paths of the sub-laser beam 2, and an objective lens 270 that is positioned at the front side of the processing target 3 and that positions a focus of the plurality of sub-laser beams 2 on a surface of the processing target 3.

The beam expander 230 expands the laser beam 1 to inject the laser beam 1 of uniform intensity into an input unit of the DOE 210. The DOE 210 includes diffractive grating and divides the laser beam 1 into a plurality of sub-laser beams 2 using a diffractive phenomenon. Therefore, by processing the shadow mask 3, which is a processing target with the plurality of sub-laser beams 2, a processing speed can be improved.

The high order beam block mask 240 removes the high order sub-laser beam 2 that is unnecessarily generated by the DOE 210 and may be positioned at anywhere of in the propagating paths of the sub-laser beams 2. That is, the high order beam block mask 240 may be positioned at anywhere to the rear side of the DOE 210.

The beam gap adjustor 220 includes an anamorphic optical system 220a that changes a gap between the plurality of sub-laser beams 2 in only a partial direction (i.e. in only one direction that is perpendicular to the direction of propagation) and a zoom optical system 220b that simultaneously changes a gap between the plurality of sub-laser beams 2 in all directions (i.e. in all directions that are perpendicular to the propagation of light).

As shown in FIG. 3, the anamorphic optical system 220a includes a pair of prism lenses 22, a rotation unit 21 that supports the prism lenses 22 and that adjusts tilt angles α1 and α2 by rotating the prism lenses 22, and a controller 23 that controls operation of the rotation unit 21.

The pair of prism lenses 22 have a quadrangular pillar form having a uniform section and are disposed in an alternate form, and a gap between the sub-laser beams 2 that are emitted by twice refraction by a refraction rule is different from a gap between the sub-laser beams 2 that are applied to a pair of prism lens. The rotation unit 21 may use a piezoelectric rotary positioner but is not limited to the piezoelectric rotary positioner, and may instead use various rotation driving devices.

As shown in FIG. 4, by adjusting a tilt angle a1 of a prism lens 22a and a tilt angle α2 of another prism lens 22b, a gap in one axis direction between the plurality of sub-laser beams 2 that are applied to the anamorphic optical system 220a may be changed. In FIG. 4, a gap between neighboring ones of a plurality of sub-laser beams 2 that are applied to the anamorphic optical system 220a is d1, and a gap between neighboring ones of a plurality of sub-laser beams 2 that are emitted from the anamorphic optical system 220a is d2 and represents an expanded state. In this way, the anamorphic optical system 220a changes a gap between the plurality of sub-laser beams 2 in one axis direction, i.e., an x-axis direction or a y-axis direction.

As shown in FIG. 5, the zoom optical system 220b includes a plurality of constituent lenses L1, L2, and L3. By changing positions of the constituent lenses L1, L2, and L3, while maintaining a propagating direction of the plurality of sub-laser beams 2, a gap between the sub-laser beams 2 may be adjusted. FIG. 5 illustrates a state in which each of the gaps of the incoming sub-laser beams dl is the same gap, and in which gaps of the outgoing laser sub-beams d2 between the sub-laser beams 2 gradually decreases by positional adjustment of the constituent lenses L1 and L2 of the zoom optical system 220b. While positions of each of the constituent lenses L1, L2, and L3 are changed, a position (distance from a central axis C) at which the sub-laser beams 2 arrive at the constituent lens L1, L2, and L3 is changed, and thus a gap d2 between the sub-laser beams 2, having passed through the zoom optical system 220b is changed in all directions that are perpendicular to the direction of propagation.

In this way, by using the anamorphic optical system 220a that changes a gap between the plurality of sub-laser beams 2 in only a partial direction (or one direction) and the zoom optical system 220b that simultaneously changes a gap between the plurality of sub-laser beams 2 in all directions (i.e. in both x-axis and y-axis directions), a gap between the plurality of sub-laser beams 2 may be variously changed.

Therefore, a processing pattern of various resolutions can be rapidly formed on the shadow mask 3, which is a processing target. Upon the shadow mask 3 being mounted and extended on a frame, when an opening of the shadow mask 3 is to be deformed in a partial direction, a gap of the sub-laser beams 2 is adjusted to correspond to a deformed opening pattern of the shadow mask using the beam gap adjustor 220 including the anamorphic optical system 220a and the zoom optical system 220b.

As shown in FIGS. 2 and 6, the aberration correction optical system 250 includes a first aberration correction optical system 251 that is positioned between the anamorphic optical system 220a and the zoom optical system 220b in propagating paths of the sub-laser beams 2 and a second aberration correction optical system 252 that is positioned at the rear side of the zoom optical system 220b in the propagating paths of the sub-laser beams 2. By decreasing an aberration according to a relative position between the plurality of sub-laser beams 2, the aberration correction optical system 250 enables better focusing of the sub-laser beams 2 onto a surface of the processing target 3.

By rapidly changing a propagating path of the sub-laser beam 2, the scanner 260 to processes while easily drawing an opening of a shadow mask in the processing target 3.

Figure 7:
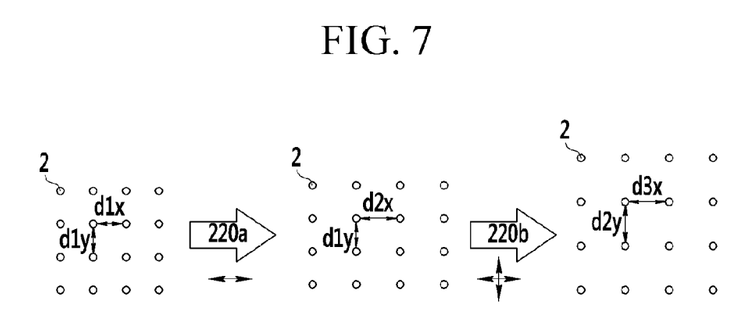
FIG. 7 is a diagram illustrating a specific use example of a beam gap adjustor of FIG. 2.

Turning now to FIG. 7, FIG. 7 is a diagram illustrating a specific use example of a beam gap adjustor of FIG. 2. As shown in FIG. 7, beam gaps d1x and d1y of a plurality of sub-laser beams 2, having passed through the DOE 210 are the same in an x-axis direction and a y-axis direction. As the plurality of sub-laser beams 2 pass through the anamorphic optical system 220a, the beam gap d2x increases only in an x-axis direction and the beam gap d1y is maintained in a y-axis direction. As the plurality of sub-laser beams 2 pass through the zoom optical system 220b, both beam gaps d3x and d2y increase in an x-axis direction and a y-axis direction. In this way, a gap between the plurality of sub-laser beams 2 is adjusted one direction then all directions using the anamorphic optical system 220a and the zoom optical system 220b respectively.

In the first exemplary embodiment, a gap between a plurality of sub-laser beams was adjusted using an anamorphic optical system and a zoom optical system, but a second exemplary embodiment may be performed that adjusts a gap between a plurality of sub-laser beams using two anamorphic optical systems that can adjust a beam gap in different directions.

Figure 8:
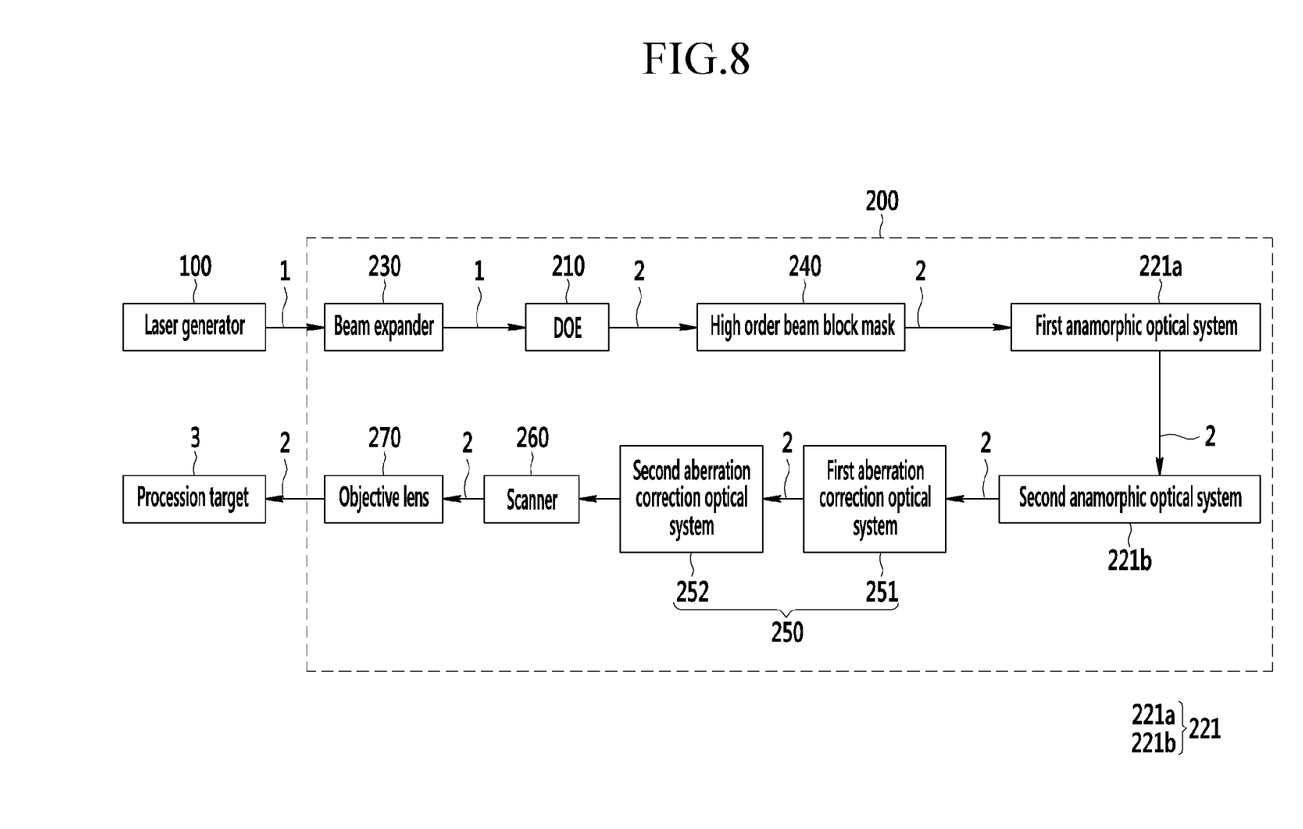
FIG. 8 is a block diagram illustrating a configuration of a laser processing apparatus according to a second exemplary embodiment.

Hereinafter, a laser processing apparatus according to a second exemplary embodiment will be described in detail with reference to FIGS. 8 and 9. Turning now to FIG. 8, FIG. 8 is a block diagram illustrating a configuration of a laser processing apparatus according to a second exemplary embodiment. The second exemplary embodiment is substantially the same as the first exemplary embodiment that is shown in FIGS. 1 to 7, except for only a structure of a beam gap adjustor, and therefore a repetition description of like components will be omitted.

As shown in FIG. 8, a beam splitting optical system 200 of a laser processing apparatus according to the second exemplary embodiment includes a DOE 210 that divides a laser beam 1 that is generated by laser generator 100 into a plurality of sub-laser beams 2, and a beam gap adjustor 221 that adjusts a gap between neighboring ones of the plurality of sub-laser beams 2.

The beam gap adjustor 221 includes a first anamorphic optical system 221a that changes a gap between the plurality of sub-laser beams 2 in one direction and a second anamorphic optical system 221b that changes a gap between the plurality of sub-laser beams 2 having passed through the first anamorphic optical system 221a in another direction intersecting the one direction and perpendicular to the direction of propagation.

The first anamorphic optical system 221a includes a pair of first prism lenses, the second anamorphic optical system 221b also includes a pair of second prism lenses, and the first prism lenses and the second prism lenses are orthogonal to each other. Therefore, the first anamorphic optical system 221a changes a gap between a plurality of sub-laser beams 2 in an x-axis direction, and the second anamorphic optical system 221b changes a gap between a plurality is of sub-laser beams 2 in an y-axis direction as the light propagates in the z-axis direction, and thus the gap between the plurality of sub-laser beams 2 may be variously changed.

The aberration correction optical system 250 includes a first aberration correction optical system 251 that is positioned at the rear side of the second anamorphic optical system 221b at an propagating path of the sub-laser beams 2 and a second aberration correction optical system 252 that is positioned at the rear side of the first aberration correction optical system 251 at an propagating path of the sub-laser beams 2. By decreasing an aberration according to a relative position between the plurality of sub-laser beams 2, the aberration correction optical system 250 enables focussing of an entirety of sub-laser beams 2 onto a surface of the processing target 3.

Figure 9:
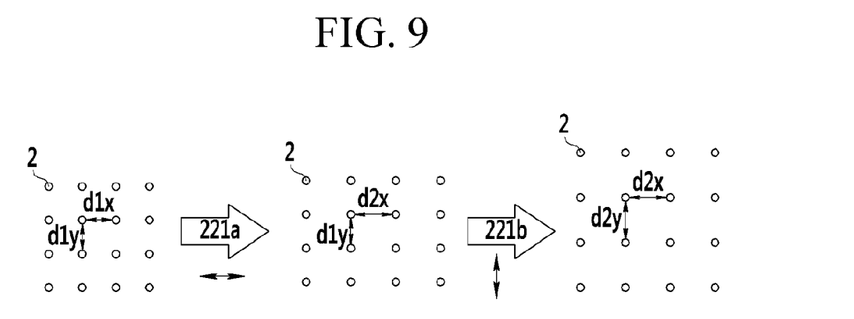
FIG. 9 is a diagram illustrating a specific use example of a beam gap adjustor of FIG. 8.

Turning now to FIG. 9, FIG. 9 is a diagram illustrating a specific use example of a beam gap adjustor of FIG. 8. As shown in FIG. 9, beam gaps d1x and d1y of a plurality of sub-laser beams 2, having passed through the DOE 210 are the same in an x-axis direction and a y-axis direction. As the plurality of sub-laser beams 2 pass through the first anamorphic optical system 221a, a beam gap d2x increases in an x-axis direction only, and the beam gap d1y is maintained in a y-axis direction. As the plurality of sub-laser beams 2 pass through the second anamorphic optical system 221b, a beam gap d2y increases in an y-axis direction only, and the beam gap d2x is maintained in an x-axis direction. In this way, a gap between a plurality of sub-laser beams 2 can be adjusted in a first direction and then in a second and intersecting direction using the first anamorphic optical system 221a and the second anamorphic optical system 221b that can change a beam gap in different directions that are perpendicular to the propagation of light.

In the first exemplary embodiment, a gap between a plurality of sub-laser beams was adjusted using the anamorphic optical system and the zoom optical system, but a third exemplary embodiment that forms a sub-laser beams in which gaps between the sub-laser beams are different in a one direction using a DOE and that then adjusts a gap between a plurality of sub-laser beams in all directions perpendicular to the propagation of light using the zoom optical system may be performed.

Figure 10:
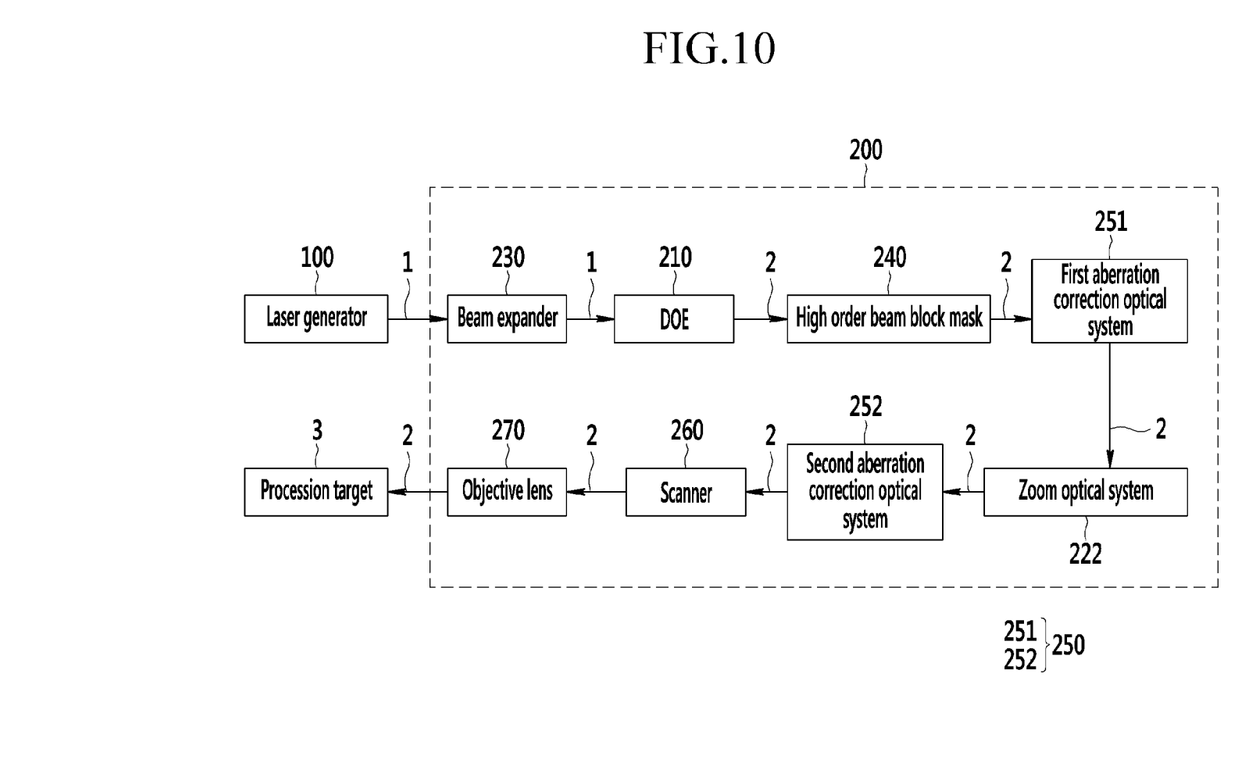
FIG. 10 is a block diagram illustrating a configuration of a laser processing apparatus according to a third exemplary embodiment.

Hereinafter, a laser processing apparatus according to a third exemplary embodiment will be described in detail with reference to FIGS. 10 and 11. Turning now to FIG. 10, FIG. 10 is a block diagram illustrating a configuration of a laser processing apparatus according to a third exemplary embodiment. The third exemplary embodiment is substantially the same as the first exemplary embodiment that is shown in FIGS. 1 to 7, except for a structure of a DOE and a beam gap adjustor, and therefore a repetition description thereof will be omitted.

As shown in FIG. 10, a beam splitting optical system 200 of a laser processing apparatus according to the third exemplary embodiment includes a DOE 210 that divides a laser beam 1 that is generated by laser generator 100 into a plurality of sub-laser beams 2 and a beam gap adjustor (i.e. zoom optical system) 222 that adjusts a gap of the plurality of sub-laser beams 2. In the third embodiment of FIGS. 10 and 11, the DOE 210 produces different gaps between neighboring ones of the plurality of sub-laser beams 2 in the x direction than in the y direction.

Particularly, as a shadow mask is mounted and extended in a frame, when an opening of the shadow mask should be deformed in a partial direction, by differently forming a gap of a diffractive pattern of the DOE 210, a gap between sub-laser beams 2 can be adjusted to correspond to a deformed opening pattern of the shadow mask.

The beam gap adjustor 222 includes a zoom optical system 222 that simultaneously changes a gap between the plurality of sub-laser beams 2 in all directions perpendicular to the direction of propagation. The aberration correction optical system 250 includes a first aberration correction optical system 251 that is positioned at the front side of the zoom optical system 222 and in propagating paths of the sub-laser beams 2 and a second aberration correction optical system 252 that is positioned at the rear side of the zoom optical system 222 and in propagating paths of the sub-laser beams 2. By decreasing an aberration according to a relative position between the plurality of sub-laser beam 2, the aberration correction optical system 250 enables for improved focusing of the sub-laser beams 2 on a surface of the processing target 3.

Figure 11:
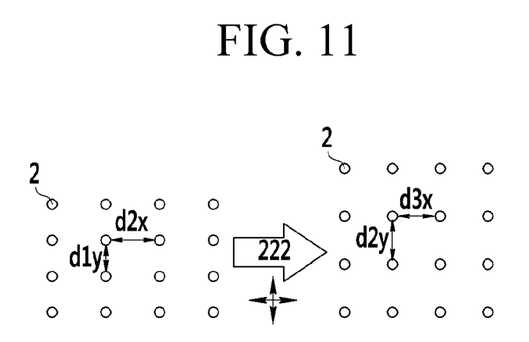
FIG. 11 is a diagram illustrating a specific use example of a DOE and a beam gap adjustor of FIG. 10.

Turning now to FIG. 11, FIG. 11 is a diagram illustrating a specific use example to of a DOE and a beam gap adjustor of FIG. 10. As shown in FIG. 11, beam gaps d2x and d1y of a plurality of sub-laser beams 2, having passed through the DOE 210 are different in an x-axis direction than in a y-axis direction. This is because the DOE 210 differently forms gaps between the plurality of sub-laser beams 2.

As the plurality of sub-laser beams 2 pass through the zoom optical system 222, is both beam gaps d3x and d2y increase in an x-axis direction and a y-axis direction. In this way, a gap between the plurality of sub-laser beams 2 can be adjusted in one or every direction perpendicular to the direction of propagation of light using the DOE 210 and the zoom optical system 222.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

100: laser generator
200: beam splitting optical system
210: DOE
220: beam gap adjustor
220a: anamorphic optical system
220b: zoom optical system
221: beam gap adjustor
221a: anamorphic optical system
221b: zoom optical system
230: beam expander
240: high order beam block mask
250: aberration correction optical system
251: first aberration correction optical system
252: second aberration correction optical system
260: scanner
270: objective lens
300: stage

What is claimed is:

1. A laser processing apparatus, comprising:
   a laser generator that generates a laser beam;
   a diffractive optical element (DOE) that divides the laser beam that is generated by the laser generator into a plurality of sub-laser beams; and
   a beam gap adjustor that adjusts a gap between neighboring ones of the plurality of sub-laser beams that are spaced-apart from each other, wherein the beam gap adjustor comprises:
      an anamorphic optical system that changes a gap between neighboring ones of the plurality of sub-laser beams in only one direction that is perpendicular to a propagation direction of the sub-beams; and
      a zoom optical system that changes a gap between neighboring ones the plurality of sub-laser beams in two different intersecting directions that are both perpendicular to the propagation direction of the sub-beams, wherein the sub-laser beams output from the anamorphic optical system are incident onto the zoom optical system.

2. The laser processing apparatus of claim 1, wherein the anamorphic optical system comprises a pair of prism lenses.

3. The laser processing apparatus of claim 2, wherein the anamorphic optical system further comprises:

a rotation unit that adjusts a tilt angle of ones of the pair of prism lenses by rotating ones of the pair of prism lenses; and
a controller that controls an operation of the rotation unit.

4. The laser processing apparatus of claim 1, further comprising an aberration correction optical system that corrects an aberration according to a relative position between ones of the plurality of sub-laser beams.

5. The laser processing apparatus of claim 4, wherein the aberration correction optical system comprises:
a first aberration correction optical system arranged between the anamorphic optical system and the zoom optical system and in propagating paths of the sub-laser beams; and
a second aberration correction optical system arranged at the rear side of the zoom optical system and in propagating paths of the sub-laser beams.

6. The laser processing apparatus of claim 1, wherein the DOE is adapted to produce different sized gaps between neighboring ones of the plurality of sub-laser beams based on different directions taken perpendicular to a propagation direction of the sub-laser beams.

7. The laser processing apparatus of claim 6, wherein the beam gap adjustor comprises a zoom optical system that changes gaps between neighboring ones of the plurality of sub-laser beams in all directions perpendicular to the propagation direction of the sub-laser beams.

8. The laser processing apparatus of claim 7, further comprising an aberration correction optical system that corrects an aberration according to a relative position between the plurality of sub-laser beams.

9. The laser processing apparatus of claim 8, wherein the aberration correction optical system comprises:
a first aberration correction optical system arranged at the front side of the zoom optical system and in propagating paths of the sub-laser beams; and
a second aberration correction optical system arranged at the rear side of the zoom optical system and in propagating paths of the sub-laser beams.

10. The laser processing apparatus of claim 1, further comprising a high order beam block mask to remove a high order sub-laser beam of the plurality of sub-laser beams.

11. The laser processing apparatus of claim 1, further comprising a beam expander arranged at the front side of the DOE to inject a laser beam of uniform intensity into the DOE.

12. The laser processing apparatus of claim 1, wherein each of the plurality of sub-laser beams propagate in a direction that is parallel to one another.

13. The laser processing apparatus of claim 5, wherein the first and second aberration correction optical systems are spaced apart from each other by the zoom optical system, each of the first and second aberration correction optical systems are comprised only of lenses.

14. The laser processing apparatus of claim 1, further comprised of the beam gap adjustor disposed to increase a size of a gap between neighboring ones of the plurality of sub-laser beams.

15. The laser processing apparatus of claim 1, wherein each of the anamorphic optical system and the zoom optical system serve to increase a size of a gap between neighboring ones of the plurality of sub-laser beams.

16. A laser processing apparatus, comprising:
a laser generator that generates a laser beam;
a diffractive optical element (DOE) that divides the laser beam that is generated by the laser generator into a plurality of sub-laser beams; and
a beam gap adjustor that adjusts a gap between neighboring ones of the plurality of sub-laser beams that are spaced-apart from each other, wherein the beam gap adjustor comprises:
a first anamorphic optical system that changes a gap between neighboring ones of the plurality of sub-laser beams in one direction perpendicular to a propagation direction of the sub-laser beams; and
a second anamorphic optical system that changes a gap between the plurality of sub-laser beams, having passed through the first anamorphic optical system, in a second direction intersecting the one direction and perpendicular to the propagation direction of the sub-laser beams.

17. The laser processing apparatus of claim 16, wherein the first anamorphic optical system comprises a pair of first prism lenses, the second anamorphic optical system comprises a pair of second prism lenses, and the first prism lenses and the second prism lenses are orthogonal to each other.

18. The laser processing apparatus of claim 16, further comprising an aberration correction optical system that corrects an aberration according to a relative position between the plurality of sub-laser beams.

19. The laser processing apparatus of claim 18, wherein the aberration correction optical system comprises:
a first aberration correction optical system arranged at the rear side of the second anamorphic optical system and in propagating paths of the sub-laser beams; and
a second aberration correction optical system arranged at the rear side of the first aberration correction optical system and in propagating paths of the sub-laser beams.

20. The laser processing apparatus of claim 16, wherein the second direction is perpendicular to both the one direction and the propagation direction.

21. A laser processing apparatus, comprising:
a laser generator that generates a laser beam;
a diffractive optical element (DOE) that divides the laser beam that is generated by the laser generator into a plurality of sub-laser beams; and
a beam gap adjustor that adjusts a gap between neighboring ones of the plurality of sub-laser beams that are spaced-apart from each other, wherein the DOE is adapted to produce different sized gaps between neighboring ones of the plurality of sub-laser beams in a first direction perpendicular to a propagation direction of the sub-laser beams than in a second direction that is perpendicular to both the first direction and the propagation direction.

* * * * *